United States Patent
Ives

[15] 3,683,197
[45] Aug. 8, 1972

[54] ELECTRICAL SYSTEMS FOR ROAD VEHICLES

[72] Inventor: Andrew Peter Ives, Warwickshire, England

[73] Assignee: Joseph Lucas (Industries) Limited, Birmingham, England

[22] Filed: Dec. 14, 1970

[21] Appl. No.: 97,967

[30] Foreign Application Priority Data

Dec. 30, 1969  Great Britain..........63,228/69

[52] U.S. Cl. ..............................307/10 R, 340/163
[51] Int. Cl. ...............................................H02j 1/08
[58] Field of Search .....307/9, 10; 340/163, 168, 169

[56] References Cited

UNITED STATES PATENTS 3,544,803  12/1970  Taylor......................307/10 R

Primary Examiner—Robert K. Schaefer
Assistant Examiner—William J. Smith
Attorney—Holman & Stern

[57] ABSTRACT

An electrical system for a road vehicle includes a signal producing means which operates in a cycle to scan a number of switches in turn. If any switch is closed, a signal is supplied to a feed line, and this signal operates a load which is to be controlled by the switch which is closed. The load remains energized for a period of time longer than the scanning time of the signal producing means, and so as long as a switch remains closed, its load will remain energized, although only one feed line is necessary to conduct power to the load.

1 Claim, 4 Drawing Figures

3,683,197

ELECTRICAL SYSTEMS FOR ROAD VEHICLES

This invention relates to electrical systems for road vehicles.

A system according to the invention has the following features.
- a. a plurality of electrical loads disposed around the vehicle
- b. a plurality of centrally situated switches, one for each load
- c. a supply line extending around the vehicle
- d. feed line means extending around the vehicle
- e. signal producing means operating cyclically to scan the switches in turn and to supply a signal to the feed line means when a switch is operated, the signal being supplied to the feed line means only when the switch is being scanned, and the signals associated with the switches respectively being unique
- f. a plurality of control devices, one for each load, the control devices being positioned adjacent their respective loads and each being connected to the feed lines
- g. the control device associated with any given load is energized only by a signal on the feed line means produced by closing of the switch associated with the given load
- h. each control device when energized connects its load to the supply line, so that the load is energized for a period of time greater than the cycle time of the signal producing means.

Figure 1:
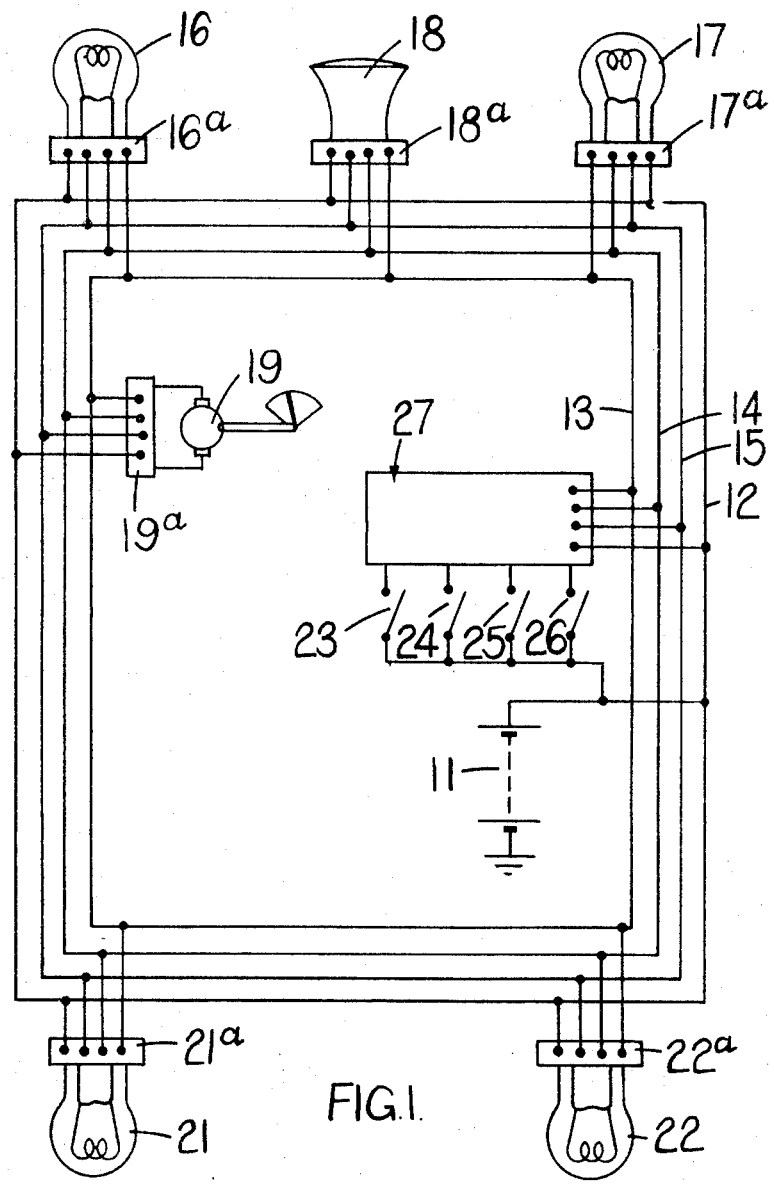
Figure 2:
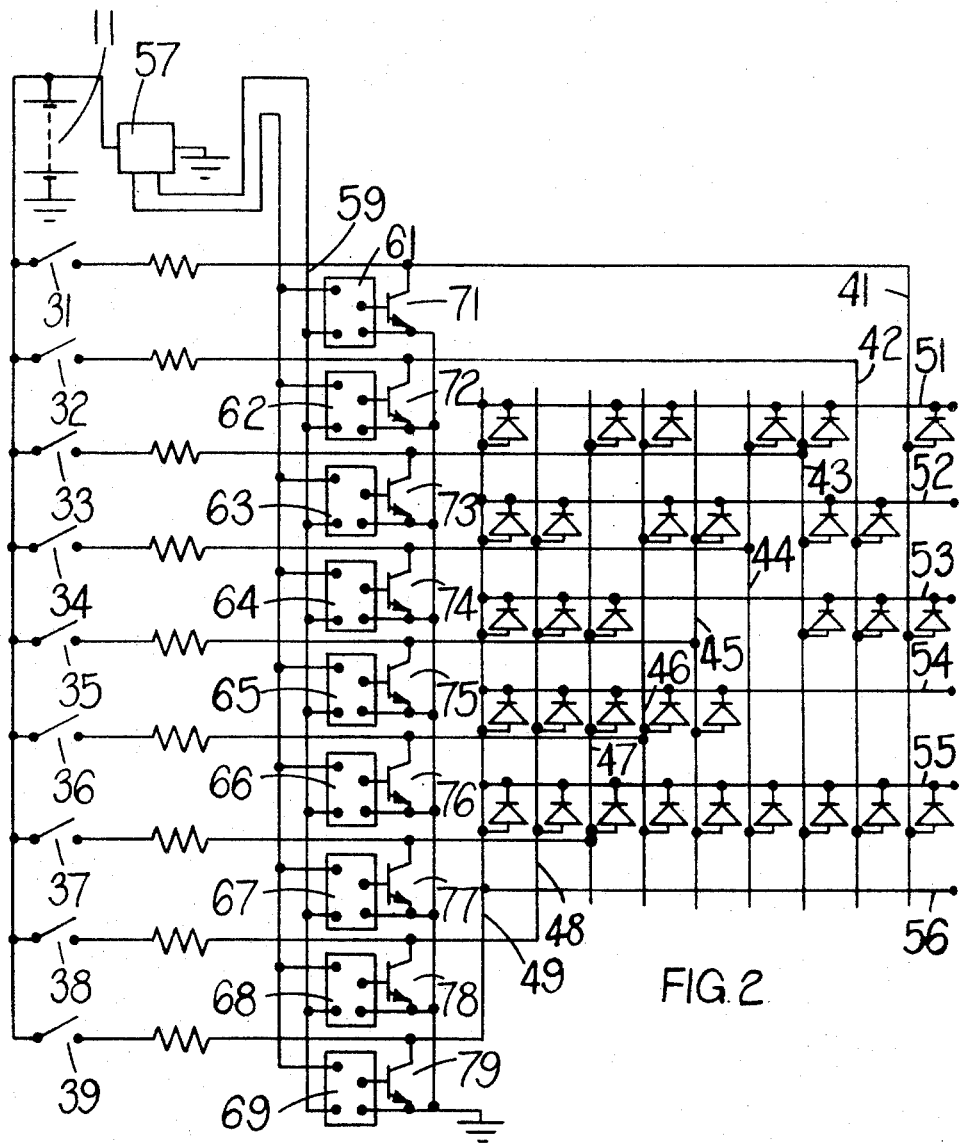
Figure 3:
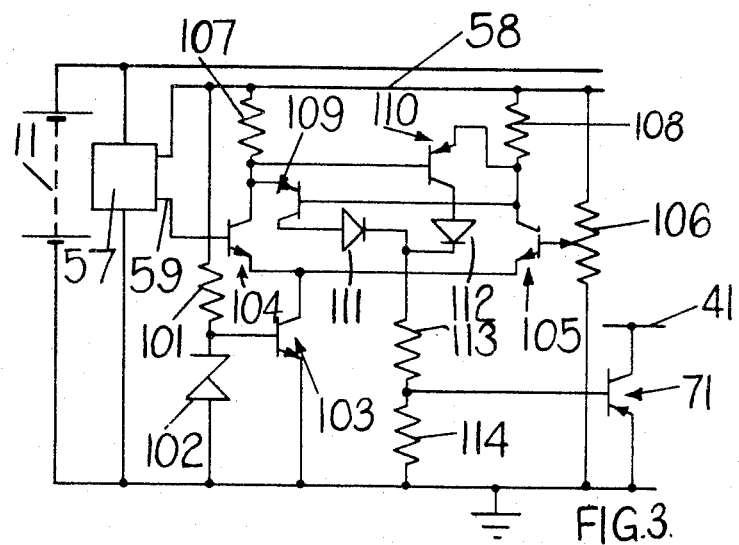
Figure 4:
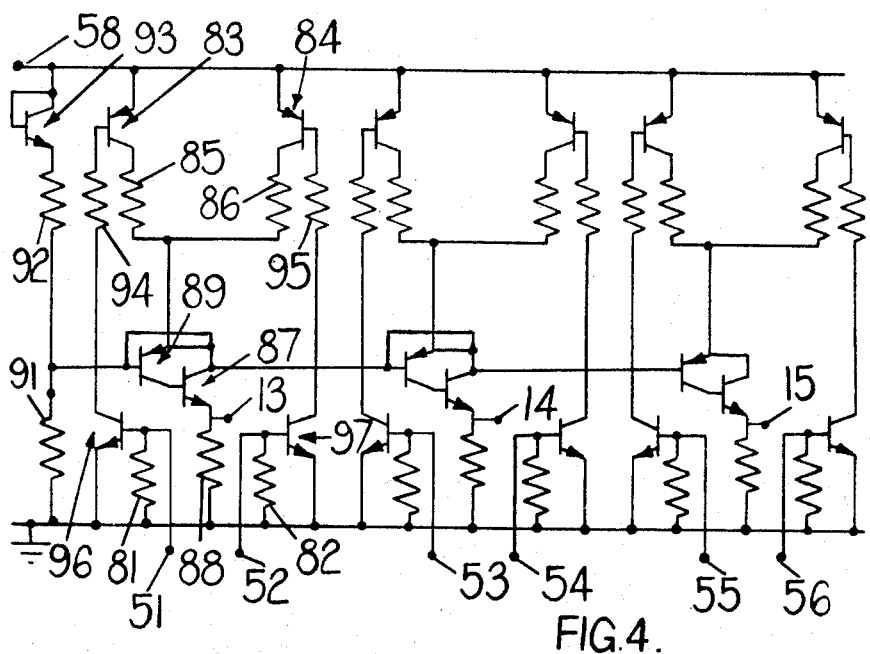

An example of the invention is illustrated in the accompanying drawings, in which:

FIG. 1 is a circuit diagram, partly in block form, of an electrical system for a road vehicle, FIG. 2 is a detailed circuit diagram of part of the block 27 in FIG. 1, FIG. 3 is a circuit diagram of a voltage discriminator used in FIG. 2, and FIG. 4 is a circuit diagram of a binary to tertiary converter used in the system.

Referring first to FIG. 1, the vehicle battery 11 supplies power to a supply line 12 which extends around the vehicle in close proximity to three feed lines 13, 14, 15. Positioned around the vehicle are a plurality of electrical loads such as the vehicle headlamps 16 and 17, horn 18, windscreen wiper motor 19 and side lamps 21 and 22. Each load has an earth return, and is connectable to the line 12 through a control device, the control devices being ascribed the same reference numerals as their loads but with the suffix a. All the control devices are connected to the lines 13, 14, 15.

The system further includes switches 23 and 24 controlling the horn 18 and the motor 19, a switch 25 controlling the lamps 16 and 17, and a switch 26 controlling the lamps 21 and 22.

The switches 23 to 26 are connected between the battery 11 and a signal producing means 27 which provides an output to the lines 13, 14, 15. Each line 13, 14, 15 can have impressed on it either no voltage or one of three voltage levels, so that using the three voltage levels, the lines 13, 14, 15 can carry in all twenty-seven different signals, although in the arrangement illustrated in FIG. 1, only four are required. The means 27 operates in a cycle of predetermined duration and scans the switches 23 to 26 in turn. While one of the switches is being scanned, a signal unique to that switch is impressed on the lines 13, 14, 15, provided of course that the switch is closed. Each of the control devices is energized by a signal on the lines 13, 14, 15 corresponding to the appropriate switch, so that if the switch 23 is closed, the control device 18a will be energized when the switch 23 is scanned. The device 18a then connects the horn 18 to the line 12 for a period of time slightly greater than the period of operation of the means 27. Thus, although the signal on the lines 13, 14, 15 will disappear when the switch 23 has been scanned, the horn will remain operated. If the switch 23 is still closed next time it is scanned, then the device 18a will be re-energized to keep the horn operated. If the switch 23 is now open, then the horn remains energized only for a short period of time while the device 18a operates. The cycle times are of course so short that a driver will never notice that there is a delay between opening of a switch and de-energization of the associated load.

The system operates in the same way for each switch 23 to 26, except of course that the signal produced when the switch 25 is closed energizes both devices 16a and 17a, and likewise the devices 21a and 22a are both energized by the signal produced when the switch 26 is closed.

The use of control devices, each of which conveniently comprises three voltage discriminators followed by an AND gate and a monostable circuit, enables a system to be produced which will be universal to any vehicle, subjected to the limitation in the example described of twenty-seven separately switched loads, although of course this number can be increased if necessary by having a third voltage level, or a fourth feed line, or both. If a further load is added, all that is required is to provide a further switch so that during the cycle another signal appears on the lines 13, 14, 15. The new load is then provided with a control device sensitive to this signal.

Referring now to FIG. 2, a more detailed arrangement is shown using nine of the possible twenty-seven switches, shown at 31 to 39. These switches serve when closed to connect the positive battery terminal through resistors to the nine input lines 41 to 49 respectively of a diode matrix having six output lines 51 to 56. Connected to the battery 11 is a voltage generator 57 which, assuming a twelve volt system, supplies an eight volt input by way of a supply line 58 to nine voltage discriminators 61 to 69. The generator 57 also supplies a ramp voltage to a line 59 connected to the discriminators 61 to 69, which have associated with them respectively transistors 71 to 79, each of which when conductive short-circuits its respective line 41 to 49.

In order to understand the operation of the discriminators 61 to 69, reference is directed to FIG. 3, which shows the discriminator 61. This discriminator includes a resistor 101 and a Zener diode 102 connected in series between the line 58 and earth, the junction of the resistor 101 and Zener diode 102 being connected to the base of an n-p-n transistor 103, the emitter of which is earthed and the collector of which is connected to the emitters of a pair of n-p-n transistors 104 and 105. The base of the transistor 104 is connected to the line 59, whilst the base of the transistor 105 is connected to a variable point on a resistor 106 connected between the line 58 and earth. The collectors of the transistors 104 and 105 are connected to the line 58 through a pair of resistors 107, 108 which are equal in value. Moreover, the collector of the transistor 104 is connected to the emitter of a p-n-p transistor 109, the collector of which is connected to the anode of the diode 111, and the base of which is connected to the collector of the transistor 105. The collector of the transistor 105 is connected to the emitter of a p-n-p transistor 110, the collector of which is connected to the anode of the diode 112 and the base of which is connected to the collector of the transistor 104. The cathodes of the diodes 111 and 112 are connected to earth through a pair of resistors 113, 114 in series, and the junction of the resistors 113, 114 is connected to the base of the p-n-p transistor 71, the collector of which is connected to the line 41 and the emitter of which is connected to earth.

The base voltage of the transistor 105 is predetermined, but the base voltage of the transistor 104 varies under the control of the voltage generator 57, which as previously explained is providing a ramp voltage to the line 59. Assume for the moment that the transistor 105 is conducting more heavily than the transistor 104, then the transistor 109 has its base at a negative potential relative to its emitter, and can conduct. Current flows through the transistor 109 and the diode 111 to turn on the transistor 71, short-circuiting the line 41. At this stage the transistor 110 is off. Assume now that the transistor 104 is conducting more heavily than the transistor 105, and it will be seen that the transistor 109 is off, but the transistor 110 is on, so that current flowing through diode 112 turns on the transistor 71, short-circuiting the line 41. Thus, if the transistor 104 conducts more or less than the transistor 105, the transistor 71 is held on. However, whilst the ramp voltage is applied to the base of the transistor 104, there will be one point in each cycle at which the transistor 104 will conduct the same current as the transistor 105, and at this point the transistors 109 and 110 will both be off, and the transistor 71 will turn off.

Reverting to FIG. 2, the voltage discriminators 61 to 69 each have a transistor corresponding to the transistor 105, but the base voltages of these transistors are all arranged to be different, and increase from a minimum for the transistor 105 in the discriminator 61, to a maximum for the equivalent transistor in the discriminator 69. It will be seen, therefore, that as the ramp voltage on the line 59 increases, the lines 41 to 49 will be scanned in turn by having the short-circuits removed from them as a result of each discriminator 61 to 69 in turn removing base current from its transistors 71 to 79.

As the lines 41 to 49 are scanned in turn, then provided that the appropriate switch 31 to 39 is closed, a binary output appears at the lines 51 to 56 under the control of a diode matrix. In the example with twenty-seven switches, it is more convenient to have three blocks of discriminators each with its own diode matrix, the three matrices feeding common lines 51 to 57 and all twenty-seven discriminators receiving an input from the source 57. The reason for using three sets of nine discriminators and three matrices is that the nine discriminators and their matrix can readily be produced in integrated form.

The six lines 51 to 56 could of course be used as feed lines extending around the vehicle, but it is preferable to have only three lines 13, 14, 15 and so the six bit binary information is transformed to three bit tertiary information by the circuit shown in FIG. 3. The outputs to the lines 13, 14, 15 are controlled by the inputs from the pairs of lines 51, 52; 53,54; and 55, 56 and since each of the three parts of the circuit are the same only one will be described. Thus, the lines 51 and 52 are earthed through resistors 81, 82 and are also connected to the bases of n-p-n transistors 96, 97 having their collectors connected through resistors 94, 95 to the bases of p-n-p transistors 83, 84, the emitters of which are connected to the eight volt supply line 58. The emitters of the n-p-n transistor 96, 97 are connected to the earth vane. The collectors of transistors 83, 84 are connected through unequal resistors 85, 86 to the emitter of a p-n-p transistor 89, the collector of which is connected to the base of an n-p-n transistor 87 whose collector is connected to the emitter of transistor 89 and whose emitter is connected through resistor 88 to earth and is also connected to line 13. The transistor 89, and the equivalent transistors in the other two parts of the circuit receive their base current from the junction of a pair of resistors 91, 92 connected in series with an n-p-n transistor 93 having a base-collector coupling.

As will be seen, a 00 signal on the lines 51, 52 produces a zero signal on the line 13. A 01 signal produces a first voltage level on the line 13 and a 10 signal produces a second and higher voltage level on line 13. A 11 signal produces a third equal to the combination of the two previous voltages and highest voltage level on the line 13, signals are produced similarly on lines 14 and 15.

Having thus described my invention what I claim as new and desire to secure by Letter Patent is:

1. An electrical system for a road vehicle, having the following features:
    a. a plurality of electrical loads disposed around the vehicle
    b. a plurality of centrally situated switches, one for each load
    c. a supply line extending around the vehicle
    d. at least three feed lines extending around the vehicle
    e. signal producing means operating cyclically to scan the switches in turn and to supply a signal to the feed lines when a switch is operated, the signal being supplied to the feed lines only when the switch is being scanned, and the signals associated with the switches respectively being unique and in the form of voltage levels
    f. a plurality of control devices, one for each load, the control devices being positioned adjacent their respective loads and each being connected to the feed lines
    g. the control device associated with any given load is energized only by a signal on the feed lines produced by closing of the switch associated with the given load
    h. each control device when energized connects its load to the supply line, so that the load is energized for a period of time greater than the cycle time of the signal producing means.

* * * * *